(12) United States Patent
Moen et al.

(10) Patent No.: US 9,619,251 B2
(45) Date of Patent: Apr. 11, 2017

(54) TECHNIQUES FOR DYNAMIC SYSTEM PERFORMANCE TUNING

(71) Applicants: Michael J. Moen, Olympia, WA (US); Daniel J. Ragland, Hillsboro, OR (US); Asmae Mhassni, Hillsboro, OR (US); Edward R. Hudson, Hillsboro, OR (US); Andre L. Nash, Portland, OR (US)

(72) Inventors: Michael J. Moen, Olympia, WA (US); Daniel J. Ragland, Hillsboro, OR (US); Asmae Mhassni, Hillsboro, OR (US); Edward R. Hudson, Hillsboro, OR (US); Andre L. Nash, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/291,946

(22) Filed: May 30, 2014

(65) Prior Publication Data
US 2014/0359269 A1 Dec. 4, 2014

Related U.S. Application Data

(60) Provisional application No. 61/828,980, filed on May 30, 2013.

(51) Int. Cl.
*G06F 9/00* (2006.01)
*G06F 1/00* (2006.01)
*G06F 9/445* (2006.01)
*G06F 9/44* (2006.01)

(52) U.S. Cl.
CPC ............ *G06F 9/445* (2013.01); *G06F 9/4401* (2013.01)

(58) Field of Classification Search
CPC .................................................... G06F 9/4401
USPC ........................................................... 713/2
See application file for complete search history.

(56) References Cited

U.S. PATENT DOCUMENTS

| | | | |
|---|---|---|---|
| 8,065,540 B2* | 11/2011 | Sultenfuss | 713/320 |
| 8,073,671 B2* | 12/2011 | Papaefstathiou et al. | 703/22 |
| 8,090,797 B2* | 1/2012 | Chinta et al. | 709/217 |
| 2007/0294209 A1* | 12/2007 | Strub et al. | 707/1 |
| 2011/0173251 A1* | 7/2011 | Sandhu et al. | 709/203 |
| 2011/0230209 A1* | 9/2011 | Kilian | 455/456.3 |
| 2013/0191625 A1* | 7/2013 | Mullens et al. | 713/100 |
| 2014/0317427 A1* | 10/2014 | Hill | 713/322 |

* cited by examiner

*Primary Examiner* — Suresh Suryawanshi
(74) *Attorney, Agent, or Firm* — Law Office of Herbert T. Patty

(57) ABSTRACT

Systems and methods consistent with the present disclosure include techniques for dynamic system performance tuning (DSPT). Techniques for DSPT include identifying an active software application during a user session and applying an application-specific profile that defines different system-hardware operating states of a computing system to enhance the performance of the active software application.

30 Claims, 3 Drawing Sheets

TECHNIQUES FOR DYNAMIC SYSTEM PERFORMANCE TUNING

RELATED APPLICATION

This application is a non-provisional application of U.S. Patent Application Ser. No. 61/828,980 filed May 30, 2013.

FIELD

This disclosure pertains to computing systems, and in particular (but not exclusively) to techniques for dynamically adjusting system performance.

DETAILED DESCRIPTION

Figure 1:
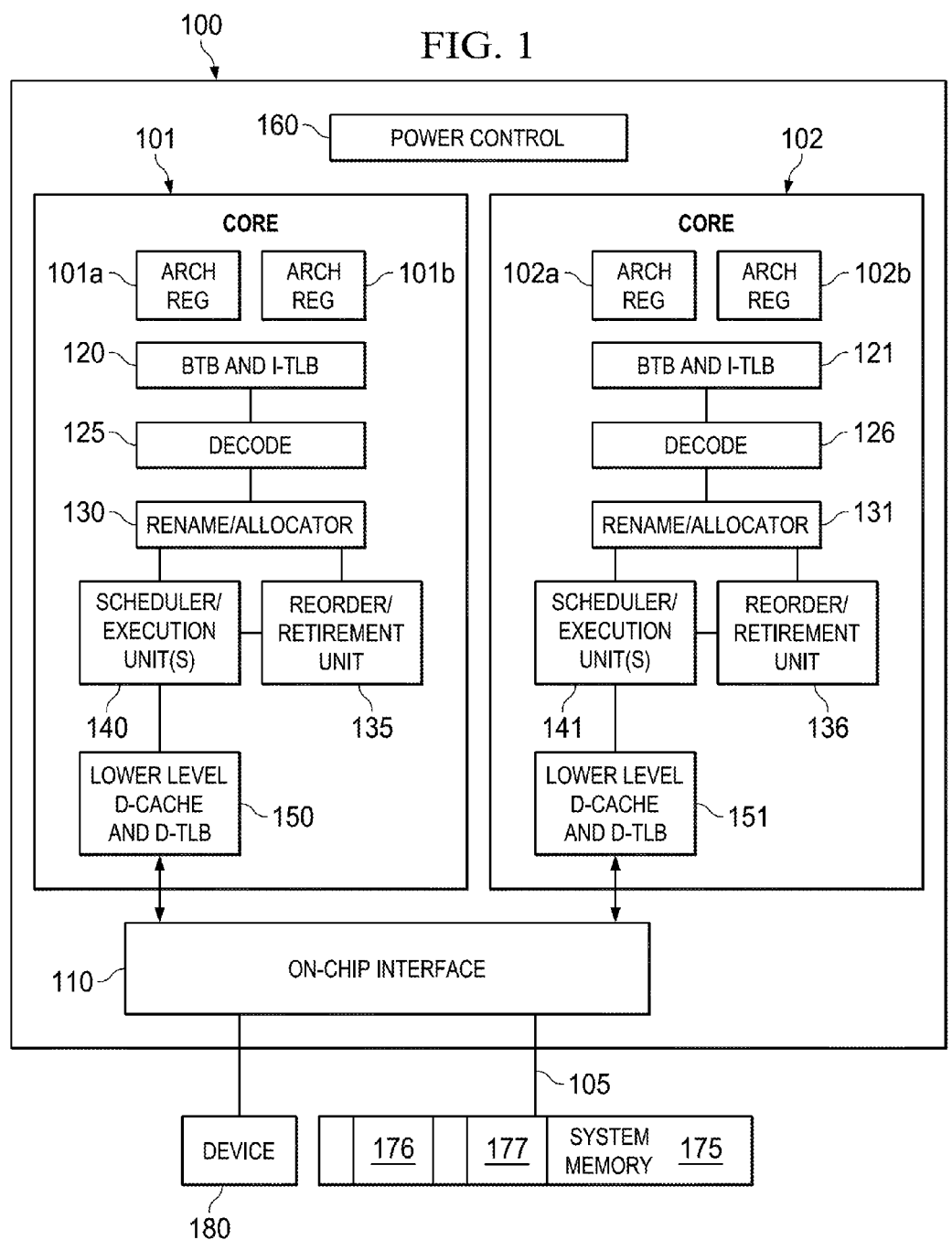
FIG. 1 is a diagram illustrating an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etcetera in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be used to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement units 135, 136, ILTB 120, load/store buffers, and queues may be shared through partitioning. Other resources, such as general purpose internal registers, page-table base register(s), low-level data-cache and data-TLB 115, execution unit(s) 140, 141, and portions of out-of-order unit 135, 136 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be used in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer blocks 130, 131 include an allocator to reserve resources, such as register files to store instruction processing results. However, threads 101a and 101b are potentially capable of out-of-order execution, where allocator and renamer blocks 130, 131 also reserve other resources, such as reorder buffers to track instruction results. Units 130, 131 may also include a register renamer to rename program/instruction reference registers to other registers internal to processor 100. Reorder/retirement units 135, 136 include components, such as the reorder buffers mentioned above, load buffers, and store buffers, to support out-of-order execution and later in-order retirement of instructions executed out-of-order.

Scheduler and execution unit(s) blocks 140, 141, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffers (D-TLB) 150, 151z are coupled to execution unit(s) 140, 141. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be used for simple compilation. A compiler may use any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etcetera in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Systems and methods consistent with the present disclosure include techniques for dynamic system performance tuning (DPST). In some embodiments, dynamic system performance tuning includes applying one of a plurality of application-specific profiles that define different system-hardware operating states. Each application-specific profile may effect system performance in a unique manner to the benefit of an end user currently using an active process in a present user session. In some embodiments, dynamic system performance tuning may be instantiated in an operating system environment as a utility application within a processor or processor core of a computing system. In one or more implementations, the utility resides and operates primarily within the processor itself. For example, the utility may reside in the processor's Power Control Unit (PCU).

In one or more implementations, dynamic system performance tuning includes a software tool that has been integrated with real-time, adjustable-hardware capabilities (e.g., registers, memory mapped input/output (MMIO), a power control unit, or processor code) that exist on a processor or processor core (e.g., Intel® Ivy Bridge, Haswell, Broadwell, Sky Lake, and Cannon Lake architectures).

In some embodiments, the process is a software application. Accordingly, the performance of any number of software applications active during a user session may be enhanced as a result of applying an application-specific profile to system hardware. In one or more embodiments, the software application for which the application-specific profile is applied may be referred to as a "priority application."

In one implementation of the present disclosure, dynamic system performance tuning involves adjusting the operating states of multiple elements of one or more hardware parameters such as, but not limited to, processor core states/affinity/frequency/current/voltage/power, graphics frequency/current/voltage/power, solid-state drive (SSD) NAND frequency, SSD Bus Frequency, SSD Power, SSD voltage, SSD memory frequency and voltage, I/O power states, I/O priority, thermal, or power system components. Accordingly, multiple elements may be changed to achieve dynamic system performance tuning.

Moreover, the operating states of the hardware configuration parameters selected for the respective application-specific profile may be defined by an end user. Alternatively, the aforementioned operating states may be defined by an original device manufacturer (ODM)/original equipment manufacturer (OEM) based upon a platform characterization of each process/application of interest.

Figure 2:
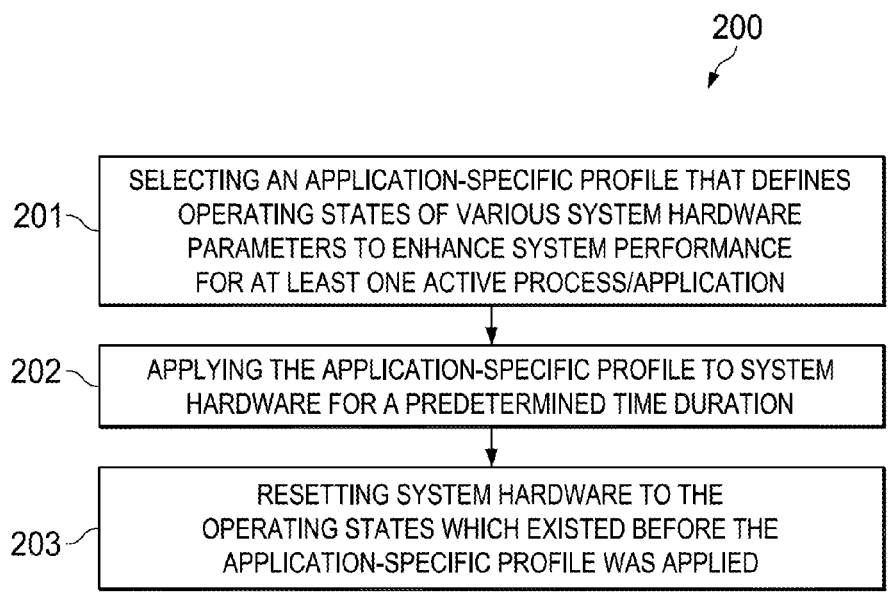
FIG. 2 is a flowchart of a method for dynamic system performance tuning in accordance with methods and systems consistent with the present disclosure.

FIG. 2 is a flowchart of a method for dynamic system performance tuning in accordance with methods and systems consistent with the present disclosure. In the embodiment shown, flow chart 200 begins at block 201—selecting an application-specific profile that defines operating states of various system hardware configuration parameters to enhance system performance for at least one active process/application. In the context of the present disclosure, applying the application-specific profiles may in some instances boost system performance or cause certain system components (e.g., processor frequency and power) to be throttled back.

In addition, the application-specific profile(s) may be applied based on any of several factors such as an environmental condition, an AC/DC power mode, or whichever applications are currently active.

Next, according to block 202, applying the application-specific profile to system hardware for a predetermined time duration. In some embodiments, the predetermined time duration is the time period that the application-specific profile is to be applied. For instance, the application-specific profile is applied for a burst time period or may be applied for up to one minute depending upon the process/application currently active. The predetermined time duration is not limited to the examples provided above. Accordingly, the application-specific profile may be applied for as long as needed to enhance the performance of the process/application of interest.

In addition, dynamic system performance tuning methods consistent with the present disclosure may be adapted to computing systems that currently run two or more active software processes (e.g., software applications). In this instance, the computing system may select an active application as a "priority process" for which the system's performance is tuned. In some embodiments, the system selects the "priority process" based on a priority scheme. For example, according to a priority scheme, the priority process may be selected as an active software application in a user focus (e.g., foreground). Alternatively, a secondary priority scheme may be used to operate a background application with priority if so determined by an ODM, OEM, or end user.

In some embodiments, after the application-specific profile is applied, the system resets system hardware (block 203) to the operating states which existed before the application-specific profile was applied. For example, if an application-specific profile elects to overclock a processor core, upon profile reset, the processor core is set back to the processing frequency (or close thereto) that existed before the application-specific profile was applied.

Figure 3:
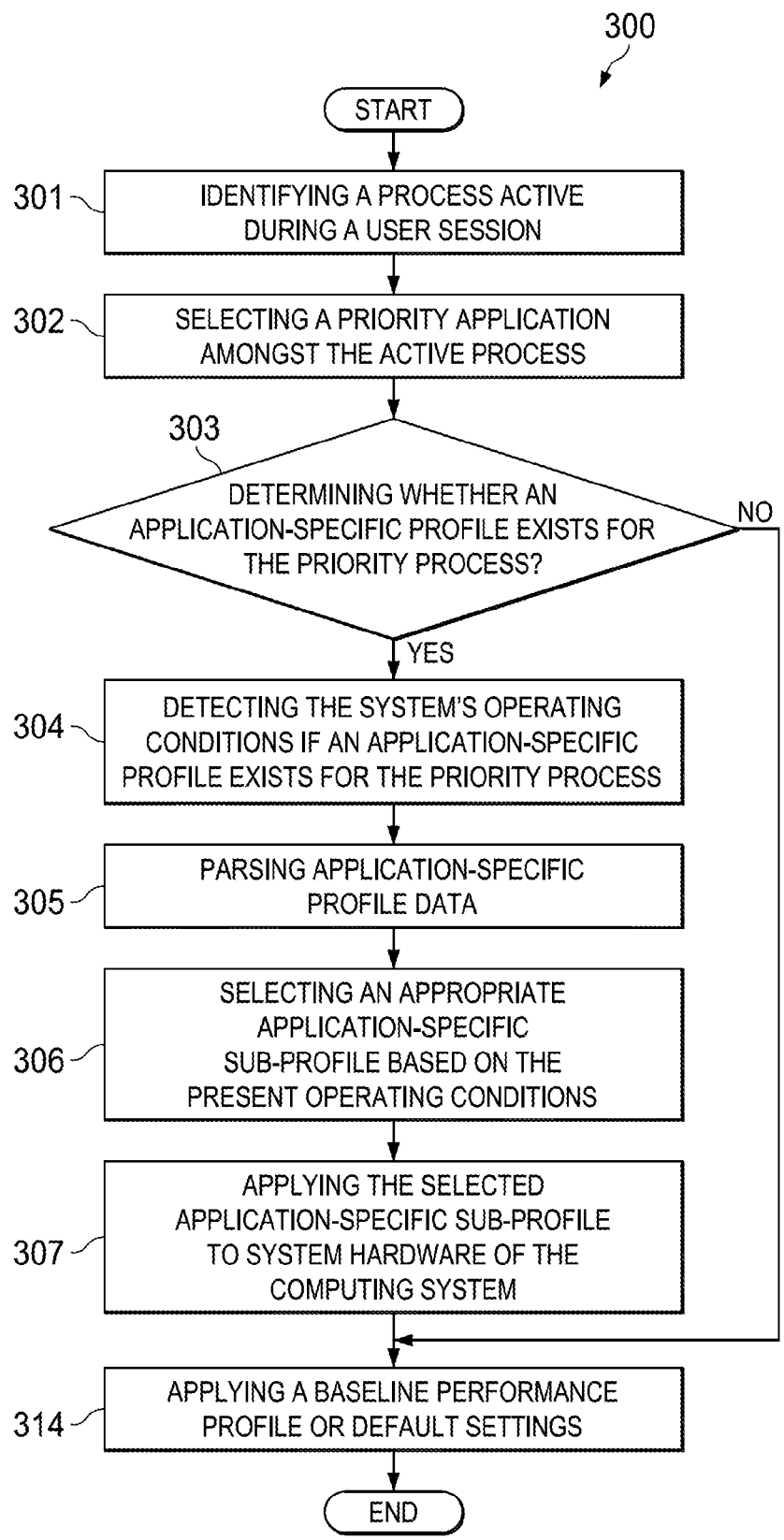
FIG. 3 is yet another flowchart of a method for dynamic system performance tuning in accordance with methods and systems consistent with the present disclosure.

FIG. 3 is yet another flowchart 300 of a method for dynamic system performance tuning in accordance with methods and systems consistent with the present disclosure. Flowchart 300 begins with block 301—identifying a process/application (e.g., software application) active during a user session.

Next, selecting a priority application amongst the active process/application—block 302. In some embodiments, the software application is selected as a priority application to which the system's performance is tuned. The priority application may be a foreground application, background application, or other process/application that is currently active during a user session. As described above, the priority application may be selected by a predefined priority scheme.

Further, according to block 303, determining whether an application-specific profile exists for the priority process/application. Computing systems which implement methods for dynamic system performance tuning, as described in this disclosure, may have access to a plurality of application specific profiles (and sub-profiles). For example, a computing system may access one or more of a graphics profile, processor or processor core profile, memory profile, storage profile or combination profile (of graphics, core, memory, and storage).

The processor or processor core profile, for instance, may include specific hardware configuration parameter settings for processor states, processor affinity, processor frequency, processor current, and processor power. The processor profile may further include at least one specific hardware configuration parameter setting for graphics frequency, graphics current, graphics voltage, graphics power, storage frequency, storage voltage, memory frequency, memory voltage, input/output (I/O) power state, I/O priority, thermal, power, or reliability system components.

In addition, systems and methods for dynamic system performance tuning may include determining whether the priority application is of a predefined category of applications. Accordingly, various software applications may be categorized by an end user or ODM/OEM such that one or a set of application-specific profiles (and application-specific sub-profiles) may be tailored thereto. For instance, a ODM/OEM may design software applications such that all applications from a specific ODM/OEM may benefit from a particular set of application-specific profiles (or sub-profiles).

In the event that an application-specific profile does not exist for the priority process/application, a baseline performance profile or default settings is applied (block 314). In particular, a baseline performance profile may have operating states that are defined by an end user, ODM, or OEM. Default settings may be defined by the system hardware operating settings of the computing system upon boot up. In some embodiments, the computing system reapplies the system-hardware operating states that were present just before the application-specific profile(s) was applied.

Next, according to block 304, detecting the system's operating conditions if an application-specific profile exists for the priority process/application. For example, sensors disposed within the computing system may accurately determine the temperature at specific areas of interest (e.g., skin temperature, ambient room temperature, exhaust temperature, and process temperature). In addition, environmental data may be obtained to determine user presence, system mobility (e.g., mobile or static), and ambient lighting conditions.

In time, application-specific profile data is parsed (block 305). In some embodiments, parsing application-specific profile data includes determining which system hardware configuration parameter settings to change according to the selected application-specific profile. For example, a processor core state/affinity/frequency/current/voltage/power, graphics frequency/current/voltage/power, solid-state drive (SSD) NAND frequency, SSD Bus Frequency, SSD Power, SSD voltage, SSD memory frequency and voltage, I/O power states, I/O priority, thermal, or power system component may be changed according to the application-specific profile selected.

Next, selecting an appropriate application-specific sub-profile based on the present operating conditions—block 306. For example, an application-specific sub-profile may be selected based on whether a computing system is in a burst state or baseline state. Furthermore, an application-specific sub-profile may be selected based on whether the computing system is in motion (e.g., mobile or static) or whether the computing system is drawing power from an AC or DC power supply.

Next, the selected application-specific sub-profile is applied to system hardware—block 307. In some embodiments, two or more application sub-profiles may be applied simultaneously so long as they are compatible. In some embodiments of the present disclosure, the selected application-specific sub-profile (or applied application-specific profile) may be applied for a finite time duration to maximize the system performance during set interval(s) of an active priority application.

In some embodiments, an application-specific profile (or sub-profile) may elect to activate a system fan (or set of fans) for a predetermined time duration. For example, an application-specific profile may elect to overclock a processor core frequency.

After the application-specific profile or sub-profile has been applied for a predetermined time duration, a baseline performance profile which includes baseline hardware configuration settings may be applied. After the application-specific sub-profile is applied for the predetermined time duration, a baseline performance profile or default settings to the computing system (block 314).

The present disclosure may be applied to a multi-core processing system such that an application-specific profile or sub-profile may be applied to each core so long as they are compatible. Likewise, a system may use methods described within the present disclosure manage various sub-systems which have their separate hardware sub-systems.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still "configured to" perform a designated task if it is designed, coupled, and/or interconnected to perform said designated task. As a purely illustrative example, a logic gate may provide a 0 or a 1 during operation. But a logic gate "configured to" provide an enable signal to a clock does not include every potential logic gate that may provide a 1 or 0. Instead, the logic gate is one coupled in some manner that during operation the 1 or 0 output is to enable the clock. Note once again that use of the term "configured to" does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases "capable of/to," and or "operable to," in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be used to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etcetera, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in some embodiments" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A non-transitory machine-readable storage medium including code, when executed, to cause a machine to:
   identify at least one active software application during a user session;
   classify the at least one active software application as a priority software application according to a priority scheme;
   determine whether an application-specific profile exists for the priority software application;
   detect at least one operating condition of the computing system;
   parse the application-specific profile data from system hardware of the computing system; and
   apply the application-specific profile to the system hardware.

2. The non-transitory machine-readable storage medium of claim 1, wherein the application-specific profile is defined by an end user, an original device manufacturer (ODM), or an original equipment manufacturer (OEM) based on specific platform characterization of the at least one active software application.

3. The non-transitory machine-readable storage medium of claim 1 further comprising code, when executed, to cause a machine to change at least one system hardware configuration parameter such as a processor core state, processor core affinity state, processor core frequency state, processor core current state, processor core voltage state, processor core power, graphics frequency, graphics current, graphics voltage, graphics power, solid-state drive (SSD) NAND frequency, SSD Bus Frequency, SSD Power, SSD voltage, SSD memory frequency and voltage, I/O power states, I/O priority, thermal or power system component.

4. The non-transitory machine-readable storage medium of claim 1, wherein the application-specific profile is selected to be applied based on a power mode or an ambient condition of the computing system.

5. The non-transitory machine readable storage medium of claim 1 further comprising code, when executed, to cause a machine to apply the application-specific profile for a predetermined time duration.

6. The non-transitory machine readable storage medium of claim 5 further comprising code, when executed, to cause a machine to apply a baseline performance profile to system hardware for a remaining time duration that the at least one software application is active during the user session.

7. The non-transitory machine readable storage medium of claim 1 further comprising code, when executed, to cause a machine to apply an operating state for a software application currently in a user focus and utilizing a secondary prioritization scheme to operate a background application when multiple software applications are active.

8. The non-transitory machine readable storage medium of claim 1, wherein to enhance system performance includes boosting system performance.

9. The non-transitory machine readable storage medium of claim 8, wherein boosting system performance includes ramping up a processor core frequency, ramping up a processor core voltage, or ramping up a processor core power.

10. A non-transitory machine readable storage medium including code, when executed, to cause a machine to:
    identify at least one software application active on a computing system during a user session;
    classify the at least one active software application as a priority software application according to a priority scheme;
    determine whether an application-specific profile exists for the priority software application;
    detect at least one operating condition of the computing system;
    parse the application-specific profile data from system hardware of the computing system; and
    apply the application-specific profile to the system hardware.

11. The non-transitory machine readable storage medium of claim 10 further comprising code, when executed, to cause a machine to select and apply an application-specific sub-profile to the system hardware based on the at least one operating condition.

12. The non-transitory machine readable storage medium of claim 10, wherein the priority software application is a foreground software application during the present user session unless the foreground software application is to maintain a present operating state.

13. The non-transitory machine readable storage medium of claim 10 further comprising code, when executed, to cause a machine to determine whether the priority software application is one of a predefined category of software applications.

14. The non-transitory machine readable storage medium of claim 10 further comprising code, when executed, to cause a machine to apply a baseline performance profile to the system hardware of the computing system when an application-specific profile does not exist for the priority software application.

15. The non-transitory machine readable storage medium of claim 11 further comprising code, when executed, to cause a machine to apply a baseline performance profile to the system hardware after the application-specific sub-profile is applied to the system hardware for a predetermined time duration.

16. The non-transitory machine readable storage medium of claim 15, wherein the baseline performance profile includes system hardware configuration parameter settings.

17. The non-transitory machine readable storage medium of claim 10, wherein to select the application-specific profile is based on whether the computing system is in a burst state, a baseline state, is in motion, or is drawing power from an AC or DC power supply.

18. The non-transitory machine readable storage medium of claim 10 further comprising code, when executed, to cause a machine to implement dynamic system performance tuning by executing instructions of an operating system layer utility application within a processor core of the computing system.

19. The non-transitory machine readable storage medium of claim 18, wherein the operating system layer utility application resides and operates within a Power Control Unit (PCU) of the processor core.

20. An apparatus, comprising:
a plurality of system hardware components;
wherein the plurality of system hardware components include at least one processor and at least one sensor, the at least one sensor to detect at least one operating condition; and
logic to execute instructions to:
employ dynamic system performance tuning (DSPT) within a computing system by:
identifying at least one software application active on a computing system during a user session;
classifying the at least one active software application as a priority software application according to a priority scheme;
determining whether an application-specific profile exists for the priority software application;
detecting at least one operating condition of the computing system;
parsing the application-specific profile data from system hardware of the computing system; and
applying the application-specific profile to system hardware of the computing system.

21. The apparatus of claim 20 further comprising two or more processor cores within the plurality of system hardware components wherein each processor core has a dedicated utility to effect dynamic system performance tuning on the corresponding processor core.

22. The apparatus of claim 20, wherein employing dynamic system performance tuning includes overclocking the at least one processor.

23. The apparatus of claim 20, wherein the apparatus is integrated within a computing notebook, laptop, or desktop computer.

24. The apparatus of claim 20, wherein the plurality of system components further includes registers, memory mapped input/output (MMIO), power control unit, and PCode.

25. The apparatus of claim 20, wherein the processor core profile includes specific configuration parameters for processor core states, processor core affinity, processor core frequency, processor core current, processor core power, and at least one specific parameter for graphics frequency, graphics current, graphics voltage, graphics power, storage frequency, storage voltage, memory frequency, memory voltage, input/output (I/O) power state, I/O priority, thermal, power, or reliability system component.

26. The apparatus of claim 20 further comprising logic to execute instructions to overlay two or more compatible application-specific sub-profiles simultaneously.

27. A method, comprising:
identifying at least one active software application during a user session; and
classifying the at least one active software application as a priority software application according to a priority scheme;
determining whether an application-specific profile exists for the priority software application;
detecting at least one operating condition of the computing system;
parsing the application-specific profile data from system hardware of the computing system; and
applying the application-specific profile to the system hardware applying a software application specific profile that defines different system least one active software application.

28. The method of claim 27, wherein the at least one active software application includes a gaming application.

29. The method of claim 27, wherein detecting the at least one operating condition includes determining at least one of a skin temperature, an ambient room temperature, an exhaust temperature, or a process temperature.

30. The method of claim 27 further comprising selecting and applying an application-specific sub-profile to the system hardware based on the at least one operating condition.

* * * * *